(12) United States Patent
Jaeker et al.

(10) Patent No.: US 9,920,815 B2
(45) Date of Patent: Mar. 20, 2018

(54) ENERGY GUIDING CHAIN AND MONITORING SYSTEM FOR PROTECTING AGAINST LINE BREAKS

(71) Applicant: igus GmbH, Cologne (DE)

(72) Inventors: Thilo-Alexander Jaeker, Sankt Augustin (DE); Felix Berger, Cologne (DE); Rene Erdmann, Cologne (DE); Dominik Barten, Mechenheim (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 15/117,382

(22) PCT Filed: Feb. 9, 2015

(86) PCT No.: PCT/EP2015/052608
§ 371 (c)(1),
(2) Date: Aug. 8, 2016

(87) PCT Pub. No.: WO2015/118143
PCT Pub. Date: Aug. 13, 2015

(65) Prior Publication Data
US 2016/0348757 A1    Dec. 1, 2016

(30) Foreign Application Priority Data

Feb. 7, 2014    (DE) .................... 20 2014 100 540 U

(51) Int. Cl.
*F16G 13/16*    (2006.01)
*H02G 3/04*    (2006.01)
(Continued)

(52) U.S. Cl.
CPC .............. *F16G 13/16* (2013.01); *G01L 5/106* (2013.01); *H02G 3/0475* (2013.01); *H02G 11/006* (2013.01)

(58) Field of Classification Search
CPC .... F16G 13/16; H02G 3/0475; H02G 11/006; G01L 5/106
(Continued)

(56) References Cited

U.S. PATENT DOCUMENTS 5,134,251 A  *  7/1992  Martin ................. H02G 3/0475
                                                    138/110
6,161,373 A  *  12/2000  Heidrich ................. F16G 13/16
                                                    248/49

(Continued)

FOREIGN PATENT DOCUMENTS

DE          2609451         *  9/1977
DE          19752377           5/1999
(Continued)

OTHER PUBLICATIONS

PCT International Search Report dated Jun. 22, 2015, received in corresponding PCT Application No. PCT/EP2015/052608.
(Continued)

*Primary Examiner* — David B Jones
(74) *Attorney, Agent, or Firm* — Grossman, Tucker, Perreault & Pfleger, PLLC

(57) ABSTRACT

An energy guiding chain (12) with additional protection against a line break is proposed. It includes link members (20) or segments for guiding one or more lines like cables, hoses or the like, wherein the link members or segments can be angled relative to each other to form a direction-changing curve (28). The protection means includes a detector for monitoring the energy guiding chain. The detector (16) is mechanically operatively connected to a low-stretch triggering cord (30) and has a sensor (36) for detecting a kinematic parameter of the triggering cord (30). A break (13) in the energy guiding chain (12 can be detected in good time by a change in the kinematic parameter. In that way guided
(Continued)

Figure 3:
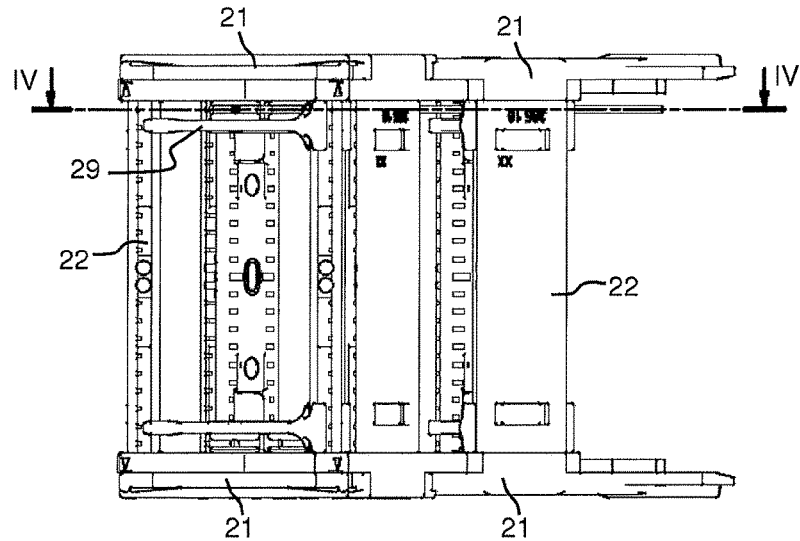

cables, hoses or the like can be protected against a line break.

37 Claims, 2 Drawing Sheets

(51) Int. Cl.
  *H02G 11/00* (2006.01)
  *G01L 5/10* (2006.01)
(58) Field of Classification Search
  USPC .......................................................... 59/78.1
  See application file for complete search history.

(56) References Cited

U.S. PATENT DOCUMENTS

| 6,367,238 | B1 * | 4/2002 | Fischer | ................... | F16G 13/16 |
| | | | | | 248/49 |
| 6,374,589 | B1 * | 4/2002 | Kunert | ................... | F16G 13/16 |
| | | | | | 249/49 |
| 6,425,238 | B1 | 7/2002 | Blase | | |
| 6,708,480 | B1 * | 3/2004 | Wehler | ................... | F16G 13/16 |
| | | | | | 248/49 |
| 2015/0135845 | A1 | 5/2015 | Hermey et al. | | |

FOREIGN PATENT DOCUMENTS

| DE | 19962829 | | 8/2001 |
| DE | 20312266 | | 8/2004 |
| DE | 20201200397 | | 7/2012 |
| DE | 202012003907 | * | 7/2012 |
| EP | 1521015 | | 4/2005 |
| JP | 2009-052714 | | 3/2009 |
| WO | 99/42743 | | 8/1999 |
| WO | 2004/090375 | | 10/2004 |
| WO | 2009/095470 | | 8/2009 |

OTHER PUBLICATIONS

PCT English language International Preliminary Report on Patentability and Written Opinion dated Aug. 18, 2016, received in corresponding PCT Application No. PCT/EP2015/052608.

* cited by examiner

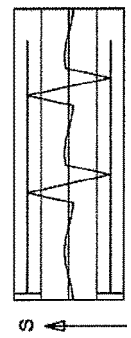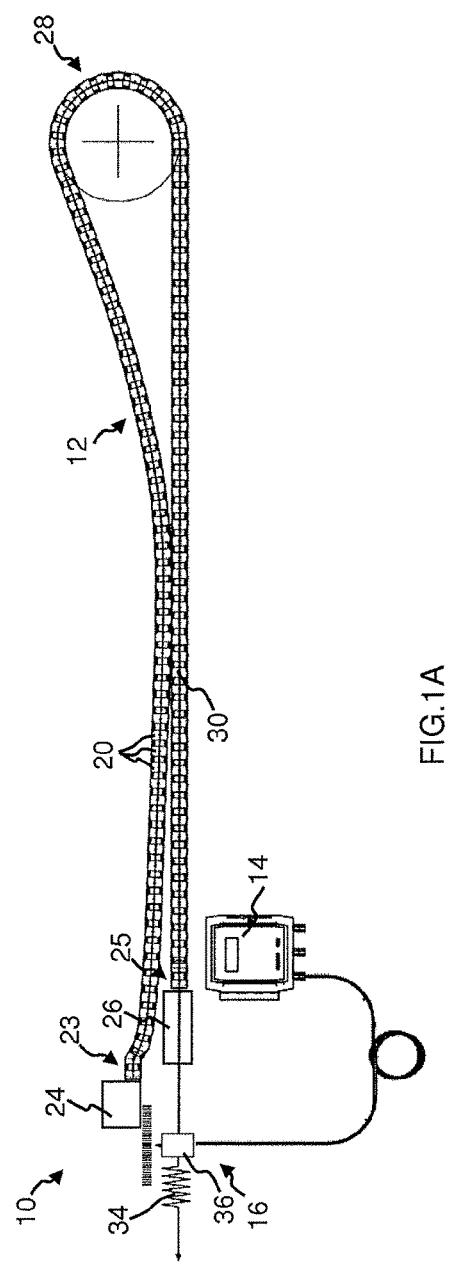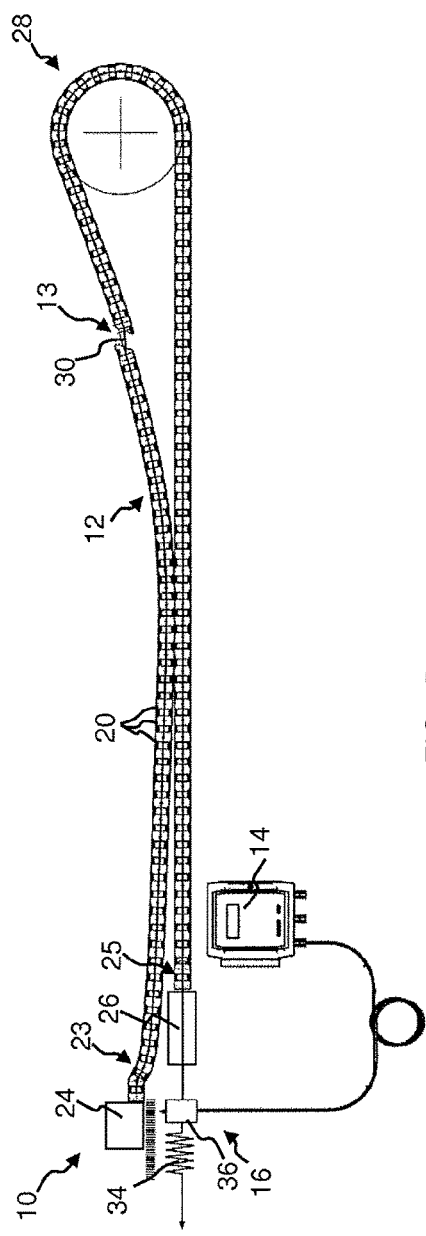

ENERGY GUIDING CHAIN AND MONITORING SYSTEM FOR PROTECTING AGAINST LINE BREAKS

The invention quite generally concerns energy guiding chains comprising a plurality of interconnected link members or segments for guiding one or more lines between a base and an entrainment member moveable relative to the base. The link members or segments can be angled relative to each other to form a direction-changing curve. Many possible options are known in regard to the design configuration of an energy guiding chain. The energy guiding chain can be assembled for example from individual chain link members. An energy guiding chain in the present sense can also be produced portion-wise in one piece by way of a plurality of segments which can be angled, or in completely one-piece fashion. The invention can therefore be applied not only to true link chains but equally to line guides which in the longitudinal direction are produced completely in one piece.

Energy guiding chains, in particular those which are incompletely protected from an external effect, can be damaged, for example by virtue of a blocking foreign body. In that case partial or complete rupture can occur. Even in the case of protected energy guiding chains a failure can happen in the energy guiding chain for example due to excessive wear, excessively high temperatures or other boundary conditions outside a reference target range.

In the worst-case scenario a rupture results in a break in one or more of the lines being guided.

The invention therefore concerns in particular an energy guiding chain which is adapted for protection against a break of the guided line or lines, as well as a suitable monitoring system. For that purpose the energy guiding chain includes a detector, for example a sensor, measuring probe or the like for monitoring whether the energy guiding chain is properly operational. The monitoring system includes at least one evaluation unit connected to the detector on the energy guiding chain.

Energy guiding chains with a monitoring system and sensors are known from international patent applications WO 2004/090375 A1 and WO 2013/156607 A1. Those systems are based on the approach of force measurement. They protect the chain itself from a break if the tensile or compressive forces exerted lie outside the reference target range. Those approaches are reliable but require relatively complicated and expensive measurement technology for force measurement. In addition the force sensors are only limitedly scalable or the reliable reference target value ranges of the forces are generally to be adjusted in application-specific fashion.

Another monitoring system for affording protection from a line break is known from international patent application WO 2009/095470 A1. In that case the entrainment member is releasably connected to the energy guiding chain by way of a coupling in such a way that when a force limit value is exceeded automatic release occurs and an emergency stop is initiated. The fact of exceeding the limit value can be determined by force measurement, in which case the foregoing disadvantages correspondingly apply. As an alternative there is also proposed there a kind of predetermined break location which however in practice can only be adapted with difficulty to different application situations. In both cases in practice there will often be erroneous triggering or an unnecessary emergency stop as the fact of a force value being exceeded does not necessarily involve a break. In addition the system should obviously have a reserve guide unit to compensate for the braking travel caused by inertia.

Patent specification JP 2009 052 714 A and patent JP 4847935 B2 describe an electro-optical break identification system for energy guiding chains. For that purpose it is proposed that an optical fiber cable or a light guide be fitted along the chain externally on the link plates. A detector detects the amount of light that the light guide carries and a detection device establishes a break in the energy guiding chain if the amount of light falls below the predetermined threshold. That solution is especially suitable for break detection. It is however quite expensive and complicated and in the event of the typically delicate light guide itself failing, for example due to ageing or an external action thereon, can lead to incorrect triggering.

Accordingly, taking the above-indicated state of the art as the basic starting point, an object of the present invention is to propose a solution which can be easily implemented for many areas of use and with which a line break in an energy guiding chain can be avoided. At the same time the invention also seeks to reduce the probability of incorrect break detection or the incorrect triggering rate. The invention further seeks to provide that the solution is as robust and long-lived as possible.

That object is attained by an energy guiding chain as set forth in claim 1 and a monitoring system as set forth in claim 16 and a use as set forth in claim 20.

The energy guiding chain according to the invention is distinguished in that the detector is operatively connected to a low-stretch triggering cord for detecting an actual break or failure in the energy guiding chain. In that case the triggering cord is guided by the energy guiding chain preferably substantially at the height of the neutral fiber. The neutral fiber, also referred to as the zero line, is the layer of the cross-section of the energy guiding chain, whose length does not change upon angular deflection or upon displacement through the direction-changing curve. With a suitable position for the triggering cord break detection becomes more precise and easier. Preferably the energy guiding chain guides the triggering cord at regular spacings and at least over a length corresponding to the region over which the direction-changing curve moves as a consequence of the movement of the entrainment member. Any cord-like line or connection which can mechanically cooperate with a detector is suitable as the triggering cord. In particular any triggering cord is referred as being low-stretch, whose inherent stretch in the case of the highest tensile force which is nominally permissible in operation at the entrainment member is less than the stretch of the energy guiding chain itself (including any play in the hinge-like joints thereof).

With the structure according to the invention the detector has a sensor for detecting a kinematic parameter and the triggering cord mechanically cooperates with the sensor. That provides for a particularly simple and robust structure.

The triggering cord is permanently flexible, in particular flexurally limp. A triggering cord has been found to be suitably low-stretch, in particular with a mechanical operating principle, wherein the stretch thereof (technical stretch), with a working load, that is to say with a nominal tensile load, corresponding to normal operation (not upon a break) is <3%, preferably <1%, with respect to the original length. Preferably the stretch still remains in the linear elasticity range even with double the working load.

The invention is therefore not based on a maximum permissible force at the entrainment member, at which an emergency stop is to occur, but by virtue of the triggering cord detects an actual break in the chain. That considerably reduces the incorrect triggering rate (which is also referred to in English as the "spurious trip rate"), that is to say unnecessary malfunctions are avoided. The cooperation according to the invention with a triggering cord for break detection also permits the use of a simpler and/or less expensive detector. A corresponding consideration also applies to the evaluation unit.

Monitoring by means of a triggering cord, in comparison with the previously known force measuring principle, is also independent of the situation of use, for example of length-related weight or the frictional forces which are to be overcome in operation. A further advantage of the invention is accordingly that the detection principle is suitable in unchanged form over wide ranges of chain lengths, that is to say for many uses.

A particularly simple detector can be used if the triggering cord is arranged in the manner of a tensile cable. In a desirable configuration of that kind the detector includes at least one sensor for travel distance, speed and acceleration detection, that is to say for measuring distance, speed, acceleration or a combination thereof, as possible kinematic parameters. The detector can have for example a sensor having a tripping circuit for producing an output signal. The sensor can also be part of a genuine measuring device, for example a sensor device, measuring probe or the like. In principle any device which responds to a change in the state of the triggering cord in the event of a break is suitable as the sensor.

In particular a suitable triggering cord with corresponding sensor can be provided at each side of the chain. With two triggering cords it is possible to recognize partial failure, for example in only one link plate line. It is also possible to reduce the spurious trip rate by redundancy.

In an inexpensive structure for monitoring at both sides a continuous triggering cord is passed along a link plate line and then back again along the other one. In that case the triggering cord is changed in direction at a chain end, for example by way of a rotatably mounted direction-changing means. The direction-changing means, in particular the axis of rotation thereof, can be operatively connected to only one detector in that way in order to detect an asymmetrical deflection. Such asymmetry or rotation or displacement in the direction-changing means in comparison with normal operation points to a break in one of the two link plate lines. That represents the typical situation in practice in the event of a failure, that is to say a break in both link chain lines at the same time is extremely rare.

It is however also conceivable for a specific triggering cord to be provided at each side or for only one triggering cord to be provided at only one side. The triggering cord is then of an overall length approximately equal to the length of the energy guiding chain and at any event less than 1.5 times the length of the energy guiding chain.

In a simple structure with monitoring at both sides, particularly if no redundancy is desired, it is possible to provide a single detector for two separate triggering cords or the two portions of a continuous triggering cord which experiences a change in direction. Independently of the type of detector it can be provided at the stationary end or at the moveable end of the energy guiding chain.

It is for example possible to use a conventional sensor in the configuration of a pull switch for a safety rope or for a pull line (which can be referred to in English as a "rope pull safety switch"). Other inexpensive sensors, in particular for detecting abrupt changes in parameters, are also suitable, for example a switch rocker, a linear position detector or travel sensor, an incremental encoder, a vibration sensor, an acceleration sensor and so forth. They generally make it possible to establish a switching threshold for a change in signal level between two states in the event of a break.

Actual measurement of the position, speed and/or acceleration at the sensor end of the triggering cord is however also in accordance with the invention. Preferably the sensor should ensure tolerance in relation to changes which are slow in respect of time, for example temperature expansion, and reliable detection by the triggering cord of abruptly produced changes in position. The latter can be facilitated by the detection of speed or possibly acceleration.

In the case of a mechanical measurement principle it is advantageous if there are provided at the energy guiding chain separately mounted or integrated cable guides or eyes which freely moveably guide the triggering cord in the longitudinal direction. In that way a relative movement of the triggering cord in the event of a break in the energy guiding chain can be easily detected by the detector. At the same time eyes can ensure the predefined position of the triggering cord in particular at the height of the neutral fiber.

To provide for the transmission of movement of the triggering cord to the sensor in a fashion which is as free from delay and losses as possible the triggering cord is not only technically low-stretch but is preferably kept under a suitable prestressing. A preferred mechanical configuration therefore provides that the detector is disposed at a chain end and the triggering cord is mounted there in a prestressed condition, for example fixed with one cord end at the sensor and with the other cord end at the end of the longitudinal region to be monitored. The end of the longitudinal region to be monitored is preferably at the other chain end or at the entrainment member where the corresponding cord end is fixed.

The monitored region can alternatively extend only over a part of the length of the energy guiding chain. It would be possible for example, starting from each side, for a triggering cord to detect somewhat more than half the overall length.

The prestressing can be implemented for example by a suitably prestressed coil spring or a combination of a direction-changing roller and tensioning weight. In the case of a stationary base the detector is desirably arranged at same, thereby avoiding a corresponding additional line in the energy guide means. A reversed arrangement however is also in accordance with the invention. An advantage of the invention is also that a suitable prestressing depends on the situation of use only in regard to a very small part and with a sufficiently low-stretch triggering cord does not have to be exactly matched to the overall length of the energy guiding chain.

To avoid incorrect triggering solely due to the structure assuming an angled configuration it is advantageous in the case of a triggering cord acting in the manner of a pull cable if the eyes are arranged at regular spacings, in particular at spacings which considered in the longitudinal direction are ≤50%, preferably ≤33%, of the length of the energy guiding chain, that extends over a 180° arcuate curve configuration of the direction-changing curve.

In a particularly preferred embodiment provided at each link member or segment is a guide eye for the triggering cord. It is possible in that way to reduce changes in tensile force due to relative movement of the cord in the direction-changing curve.

Desirably the eyes are of such a type that they extend like a sliding guide means, at least over a part of the link member or segment length in the longitudinal direction, and have transverse play. To minimize wear of the triggering cord, the eyes at both sides have mouth openings which open in a curved or rounded configuration in the longitudinal direction. The degree of curvature of the mouth opening is preferably matched to the maximum angular deflection of the link members or segments of the chain. In that way wear due to friction at the eyes themselves is reduced. The eyes can also be in the form of a purely punctiform guide, for example of a torus shape. In the last-mentioned case the configuration of the triggering cord in the direction-changing curve would correspond less to the configuration of the neutral fiber, but would rather approach a polygonal shape. A better approximation to the neutral fiber in the direction-changing curve can be achieved by the eyes being of a greater longitudinal extent. Alternatively two eyes can be provided in each link member or segment, respectively close to the adjacent link member or segment.

In a preferred embodiment which allows retro-fitment to existing energy guiding chains, the eye is integrated as a component part into a separate separating limb. Separating limbs are often already present for dividing up the internal space in the energy guiding chain. Retro-fitment can also be effected with eyes which are in the form of separate attachment portions, in particular in the form of injection molded portions, for fixing to the link members or segments, for example to the separating limbs or however to side plates. Eyes which in manufacture are already integrated into the side plates of the energy guiding chain later make it possible to retro-fit the triggering cord and the sensor system.

As is known, upon the change between a tensile and a thrust loading in most conventional energy guiding chains, stretching and upsetting effects occur caused by play in the joint connections, and such stretching and upsetting effects would have to be taken into account in evaluation or detection by sensor, detector and/or evaluation unit, in the manner of a tolerance. That applies in particular in relation to long energy guiding chains. To reduce that effect it is desirable if the energy guiding chain is equipped with a tensile strain relief means. The applicant has proposed suitable partial tensile strain relief means in international application WO 99/42743 A1. A more complex and expensive tensile strain relief means is known from laid-open application DE 19752377 A1.

In the case of a mechanical detection principle the triggering cord is preferably produced for example in the form of a rope or cable or in the form of an individual fiber, in particular of steel wire, or technical plastic. The low degree of stretchability mentioned in the opening part of this specification in relation to a working load can be readily achieved with such ropes or cables. The tensile strength can be less than the tensile strength of the energy guiding chain insofar as it is ensured that it is sufficient for cooperation with the detector, for example for an intended spring stressing. Independently of the operating principle involved the triggering cord is to be selected to be flexible and permanently resistant to constantly changing flexural loadings.

It can be provided that the triggering cord itself also breaks upon a break in the chain. For that purpose it can be provided that the triggering cord is of a lesser tensile strength so that upon a break in the energy guiding chain a break also occurs in the triggering cord. In that way in the event of a break an interruption is detected by the detector. That permits for example a flexible triggering device with a low tensile strength and preferably a high yield ratio.

Irrespective of the detection principle it is advantageous as mentioned if two triggering cords are provided. Desirably a first triggering cord is provided along one outside and a second triggering cord is provided along the oppositely disposed outside, wherein preferably for each side a suitable sensor is connected to the respective triggering cord. Conventional structures are for example those in which each link member respectively has two outer side plates or portions which are hingedly connected to adjacent side plates or portions, wherein the lines of side plates are typically connected by transverse limbs.

Besides the specific configuration of an energy guiding chain the invention also concerns a monitoring system as set forth in the classifying portion of claim 16 to protect an energy guiding chain against a line break.

That monitoring system is distinguished by an energy guiding chain corresponding to one of the foregoing embodiments, wherein the detector connected to the triggering cord is connected to the evaluation unit and the evaluation unit evaluates signals detected by the detector in regard to a possible break in the energy guiding chain.

Suitable design configurations of the evaluation unit are available to the man skilled in the art, in particular an adaptation of an evaluation unit similar to those in WO 2004/090375 A1 and WO 2013/156607 A1, or an evaluation unit of the type PPDS basic, PPDS advanced or PPDS pro (which can be obtained at igus GmbH, 51127 Cologne, Germany). The evaluation unit can evaluate the signal of the detector by an analog circuit, for example by means of a Schmitt trigger, or by a digital circuit having a computing unit like for example a microprocessor, FPGA, PLC and so forth and advantageously serves for signaling the fault situation to the installation control system. Evaluation can also already be effected in the detector itself which then communicates a processed signal to the evaluation unit.

Advantageously the design of the evaluation unit is such that it triggers an emergency stop of the entrainment member if a break in the energy guiding chain was detected by way of the triggering cord. When using a genuine measuring means or measuring device in the or as the detector, for example a linear travel sensor, a desirable configuration is one in which the evaluation unit recognizes a break if the measurement signal from the detector lies outside a tolerance field. For example the above-mentioned devices are already suitable for that purpose.

Besides the energy guiding chain and the associated monitoring system the invention also concerns a separating limb especially suitable for guiding the triggering cord. According to the invention that limb is distinguished in that the separating limb includes an eye serving as a cable guide means for a triggering cord extending in the longitudinal direction of the energy guiding chain. In that arrangement the eye can be produced in the form of a separate attachment part and fixed to the separating limb or it can be fixedly integrated into the separating limb. For both cases for example production using an injection molding process is appropriate.

Finally the invention also concerns the use of a detector and a low-stretch triggering cord for detecting a break in an energy guiding chain according to claim 20. In that respect the triggering cord is mechanically operatively connected to the detector and the detector recognizes a break in the energy guiding chain on the basis of a change in a kinematic parameter in or at the triggering cord.

Figure 4:
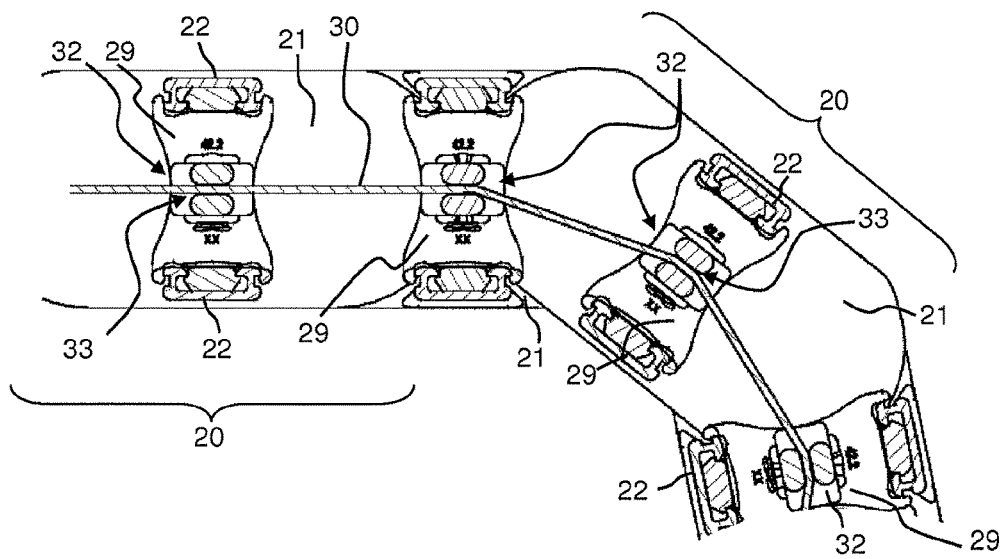
Figure 5:
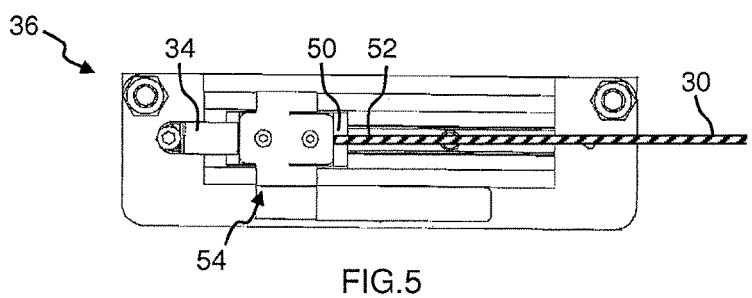

Further details, advantages and features of the invention will be seen in the description hereinafter of an embodiment by way of example with reference to the accompanying drawings in which:

FIGS. 1A-1B show diagrammatic side views of a monitoring system according to the invention and an energy guiding chain according to the invention in the operable condition (FIG. 1A) and upon a break in the energy guiding chain (FIG. 1B), FIGS. 2A-2B show a diagrammatic configuration of the output signal of a detector of the monitoring system in operation in the operable condition as shown in FIG. 1A and in the case of a break in the energy guiding chain as shown in FIG. 1B, FIG. 3 shows a plan view of an energy guiding chain equipped according to the invention, FIG. 4 shows a longitudinal section along section line IV-IV in FIG. 3 with a mechanically acting triggering cord guided by eyes, and FIG. 5 shows an example of a detector with which the triggering cord of FIG. 4 cooperates.

FIGS. 1A-1B show a diagrammatic view illustrating the principle of a monitoring system, generally identified by reference 10, for monitoring the proper operability of an energy guiding chain 12 (referred to hereinafter for brevity as the EGC 12). The monitoring system 10 includes as its main components: an especially adapted or equipped EGC 12, an evaluation unit 14 and a detector 16 arranged on the EGC 12. The detector 16 is connected in signal-transmitting relationship to the evaluation unit 14. The monitoring system 10 serves in particular for protection against a break in the guided line or lines in the event of a failure of the EGC 12.

If the EGC 12 is completely or partially ruptured at a position as indicated for example at 13 in FIG. 1B then generally it no longer satisfactorily performs its function. After a break the EGC 12 can no longer ensure protection for the line or lines (not shown), in particular against being kinked or bent.

To guide one or more line or lines like cables, hoses or the like the EGC 12 is of a very substantially known structure. The EGC 12 comprises for example a multiplicity of individual chain link members 20 which are hingedly connected together transversely relative to the longitudinal direction. It has a moveable chain end 23 fixed to an entrainment member 24. The EGC 12 further has a stationary chain end 25 which is fixedly flange-mounted to a base 26 which is generally fixed in space. The entrainment member 24 reciprocates for example along the horizontal, to the left and the right in FIGS. 1A-1B, relative to the base 26. The entrainment member 24 is for example a moveable connecting location in a machine which is to be supplied with energy, data, and/or media. The base 26 generally forms the stationary connecting location. Alternatively the entrainment member 24 can also be displaceable vertically moveably or along two axes. The EGC 12 has a direction-changing curve 28 which also moves in accordance with the movement of the entrainment member. The direction-changing curve 28 is defined for example by way of a direction-changing roller or generally by angle-limiting abutments on the chain link members 20.

The monitoring system 10 monitors whether a failure of the EGC 12 or a break 13 occurs. If the detector detects such a break 13 the evaluation unit 14 recognizes that and further signals same to a higher-order plane (not shown), for example a machine control system or an automation system of per se known structure. Upon detection of a break 13 an emergency stop of the entrainment member 24 is triggered. Thus the EGC 12 can be repaired at the break location at a time still before damage occurs at the line or lines.

An essential aspect of the invention lies in the detection principle, on the basis of which a break 13 is detected by the detector 16. According to the invention that is achieved by at least one triggering cord 30 which is operatively connected to the detector 16 and for that purpose extends over a part of or the entire length of the EGC 12.

In the illustrated embodiment as shown in FIGS. 1A through 5 the triggering cord 30 mechanically cooperates with the detector 16.

At each side of the EGC 12 as shown in FIGS. 1A through 5 a pull cable-like triggering cord 30 is guided in the EGC 12 by means of eyes 32 shown in greater detail in FIG. 4. For guidance purposes the eyes 32 are arranged as precisely as possible at the height of the neutral fiber of the EGC 12. The eyes 32 are provided at regular spacings, as shown in FIG. 4 in each case for example at each respective chain link member 20, or, when shorter chain link members are involved, for example at each second or third chain link member 20. The triggering cord 30 is put under a prestressing by a tensioning spring 34 at the cord end which is at the base 26. That cord end is fixed to a moveable part of the detector 16 (see FIG. 5) which is acted upon by the tensioning spring 34. The other cord end of the triggering cord 30 is fixedly secured to the end of the longitudinal region to be monitored. In FIGS. 4A through 5 the triggering cord is fixed to the moveable chain end 23 and/or to the entrainment member 24. Accordingly the triggering cord 30 extends over the entire length of the EGC 12 and can thus detect a break 13 at any position on the EGC 12. The triggering cord 30 should extend at least over a length corresponding to the critical region of movement, in particular of the direction-changing curve 28.

In the event of a break 13 a greater spacing occurs between two eyes 32 at the break location due to the break ends of the EGC 12 moving apart. That results in a displacement of the triggering cord 30 which is guided in defined fashion, from a predefined nominal position or its normal configuration. That in turn makes it possible to detect a kinematic change in position or speed or acceleration at the cord end, which is fixed in a prestressed condition, of the triggering cord 30. Detection is effected in the detector 16 shown in FIGS. 1A through 5 by a sensor 36 associated with the triggering cord 30, for example a linear travel sensor. The triggering cord 30 thus acts as a pulling cable to transmit force to the corresponding sensor 36. It will be appreciated that it is also possible to detect if the triggering cord 30 is torn away, but that is not necessary.

A preferred embodiment has two triggering cords 30, a respective one at each side of the EGC 12. The detector 16 correspondingly includes two sensors 36. In principle however a structure having only one triggering cord 30, for example extending centrally through the cross-section of the EGC 12, with only one corresponding sensor 36, is adequate.

FIG. 2A shows a configuration of the output signal S of a sensor 36 which corresponds to normal operation, for example a periodic reciprocating movement, of the entrainment member 24. Only fluctuations which are small in terms of magnitude and which are slow in terms of time occur. FIG. 2B in contrast shows abrupt signal peaks which occur in the event of a break 13 in the EGC 12 as the triggering cord 30 transmits a shock-like movement to the sensor 36. Such a signal peak occurs for example at the moment of the break itself, but also for example if the break location is moved by the direction-changing curve 28.

Signal peaks in the output signal S, as in FIG. 2B, can be processed by per se known signal processing, for example a single-channel analyzer or a window discriminator, in the detector 16 in order reliably to detect a break and to distinguish it from immaterial fluctuations. The detector 16 passes a corresponding output signal by signal transmission to the evaluation unit 14. Signal processing of the output signal S of the sensor 36 can also be effected substantially in the evaluation unit 14 itself. In both cases the evaluation unit 14 recognizes that a break was detected and passes a corresponding output signal to the higher-order plane.

As damage to guided lines generally occurs only if, in spite of a break 13, operation of the EGC 12 was continued over a certain period of time, the detection of an actual break avoids unnecessary faulty triggerings. It is also possible to provide an additional tolerance, for example with a corresponding counter in the evaluation unit 14, in order to trigger the fault situation only after a few signal peaks or after evaluation on the part of both sensors 36.

Instead of real measurement of the kinematic parameter, here the travel distance (or for example speed and/or acceleration) by the sensor 36 only a breach of the threshold of the kinematic parameter of the triggering cord can be detected and passed for example in the form of a change in output level to the evaluation unit 14. That can be achieved for example simply by means of a switch rocker or a tripping switch (not shown) as the sensor, with which the triggering cord cooperates for example in the form of a tripwire.

FIGS. 3-4 show a view in longitudinal section of the EGC 12 at the direction-changing curve 28 of a typical structure by way of example of the chain link members 20. Here the chain link members 20 are composed of four main component parts: two oppositely disposed side plates 21 and two transverse limbs 22 which hold the side plates 21 parallel. Those individual parts 21, 22 are produced for example from plastic using an injection molding process. Each side plate 21 has at a longitudinal end a respective mounting pin and at the opposite longitudinal end a corresponding receiving means. A pair of pin and receiving means forms a hinge connection, pivotable perpendicularly relative to the longitudinal direction, between longitudinally adjacent side plates 21. In the case of the EGC 12 shown in FIGS. 3-4 the pivot axis of the hinge connection is disposed in cross-section in each case approximately at half the height between the narrow sides of the side plates 21. Accordingly here, in relation to the cross-section of the EGC 12, the neutral fiber is in an approximately central position. The interlinking of the side plates 21 affords at each side a respective line of side plate.

When the EGC 12 is straight the prestressed triggering cord 30 is arranged as precisely as possible at the height of the neutral fiber, that is to say at the height of the pivot axes as shown at the left in FIG. 4. Accordingly the eyes 32 are so arranged that the location at which the triggering cord 30 passes through same is at that height. In the example of FIGS. 3-4 the eyes 32 are produced as separate attachment portions, for example by injection molding, and are fixedly secured by means of latching connection to separating limbs 29 internally in the EGC 12. The separating limbs 29, in the form of separate parts of known structure, are fixed by means of a latching connection to both transverse limbs 22, in particular being secured in the longitudinal direction and the heightwise direction and optionally in the transverse direction on the EGC 12. Alternatively the eyes 32 can also be suitably integrated into the separating limbs 29 directly in the manufacturing procedure. The drawing does not shown in greater detail a lateral threading-in opening for each eye 32 in order to be able to easily introduce the triggering cord 30 at the side. As an alternative to the illustrated example eyes could for example also be provided laterally externally on the side plates 21.

In the case of the mechanical operating principle the eyes 32 guide the triggering cord 30 freely moveably and with a low level of wear in the longitudinal direction but at the predefined height through the EGC 12. Upon a break in the EGC 12, for example in the line of the side plates 21 at one side, a relative movement of the triggering cord 30 necessarily occurs as the spacing between adjacent eyes 32 increases.

In the EGC 12 shown in FIGS. 3-4 the limitation on the angular relationship between two chain link members 20 is so adjusted by abutments that the direction-changing curve 28 always includes at least three chain link members 20. When an eye 32 is arranged on each chain link member the spacing therebetween, with respect to the portion length of the EGC 12 over a 180° arcuate configuration of the direction-changing curve 28, is less than a third (≤33%) of said portion length. Thus, in the direction-changing curve 28, there is a good approximation in respect of the configuration of the triggering cord 30 to the position of the neutral fiber.

Referring to FIGS. 3-4 the eyes 32 are also in the manner of a sliding guide, with an extent in the longitudinal direction, and with sufficient transverse play for freely guiding the cable or cord. At both longitudinal ends the eyes 32 have mouth openings 33 which open in a rounded or curved configuration in the longitudinal direction. The degree or radius of curvature of the mouth openings 33 is so selected in FIG. 4 that, even with the maximum angular relationship between adjacent chain link members 20, the arrangement still provides an edge-free, low-wear passage for the triggering cord 30 to pass therethrough. Preferably the material of the triggering cord 30 is so selected that optionally the eyes 32 and not the triggering cord 30 wear.

By way of example a brake cable of steel wires or a pull cable of plastic fibers is suitable. When the mechanical operating principle is employed the triggering cord is preferably in the form of a low-stretch cable for example of Dyneema® fibers, with a technical stretch of <1% under a working load. FIGS. 3-4 show a triggering cord 30 along an outside, here close to the side plates 21 (upwards in FIG. 3). At the opposite outside (downwards in FIG. 3) the EGC 12 is preferably fitted with a second triggering cord 30 and with corresponding eyes 32 in an identical fashion.

FIG. 5 shows purely by way of example a suitable sensor 36 for the detector 16. The sensor 36 is in the form of a linear travel sensor member. It includes a slider 50 guided moveably on a stationary guide rail 52 along an axis in the longitudinal direction of the EGC 12. The guide rail 52 is fixed to the base 26. The moveable end of the triggering cord 30 is fixed at one side of the slider 50. The stressing spring 34 is mounted at the other side. The triggering cord 30 is prestressed by the stressing spring 40 which is held in a prestressed condition on the base 26. The slider 50 in the rest condition should be disposed approximately centrally between limit abutments on the guide rail 52. The sensor 36 detects the movement of a position sensor 54, for example an incremental sensor, provided on the moveable slider 50. Upon a relative movement of the triggering cord 30 in relation to the actual EGC 12 movement is transmitted to the slider 50 and thus to the position sensor 54. A movement of the position sensor 54 is outputted as output signal S (see FIGS. 2A-2B) by the sensor 36 and processed by the detector 16 or possibly by the evaluation unit 14 to detect the occurrence of a break 13.

LIST OF REFERENCES

10 monitoring system
12 energy guiding chain (for brevity: EGC)

13 break
14 evaluation unit
16 detector
20 chain link member
21 side plate
22 transverse limb
23 moveable chain end
24 entrainment member
25 stationary chain end
26 base
28 direction-changing curve
29 separating limb
30 triggering cord
32 eye
33 mouth opening
34 stressing spring
36 sensor
50 slider
52 guide rail
54 position sensor

What is claimed is:

1. An energy guiding chain for protection against a failure comprising:
a plurality of interconnected link members or segments for guiding one or more lines between a base and an entrainment member moveable relative to the base, wherein the link members or segments are anglable relative to each other to form a direction-changing curve;
at least one triggering cord;
a detector for monitoring the energy guiding chain;
wherein the detector is operatively connected to the at least one triggering cord for detecting a failure in the energy guiding chain;
a plurality of eyes arranged on the plurality of interconnected link members or segments; and
wherein the at least one triggering cord is guided by the plurality of eyes such that the at least one triggering cord is guided along a longitudinal direction of the energy guiding chain.

2. The energy guiding chain as set forth in claim 1, wherein the detector includes at least one sensor; and
wherein the at least one triggering cord mechanically cooperates with the at least one sensor.

3. The energy guiding chain as set forth in claim 2, wherein the at least one triggering cord comprises at least a first triggering cord and a second triggering cord;
wherein the at least one sensor of the detector comprises a first sensor and a second sensor;
wherein the detector is operatively connected to the first triggering cord and the second triggering cord;
wherein the first triggering cord mechanically cooperates with the first sensor and the second triggering cord mechanically cooperates with the second sensor.

4. The energy guiding chain as set forth in claim 2, wherein the detector monitors at least one of position, distance, speed and/or acceleration of the at least one triggering cord.

5. The energy guiding chain as set forth in claim 2, wherein the at least one sensor produces an output signal representing position, distance, speed and/or acceleration of the at least one triggering cord.

6. The energy guiding chain as set forth in claim 5, wherein the at least one sensor provides a first and second output signal levels indicative of the energy guiding chain being unbroken and broken, respectively.

7. The energy guiding chain as set forth in claim 2, wherein the at least one sensor comprises at least one of a pull switch, a tripping switch and a rocker switch.

8. The energy guiding chain as set forth in claim 1, wherein each one of the plurality of eyes is joined to a corresponding one of the plurality of interconnected link members or segments and includes a through opening through which the at least one triggering cord extends.

9. The energy guiding chain as set forth in claim 8, wherein the plurality of eyes are provided at uniform spacings which are <50% of a length of the energy guiding chain that extends over a 180° arcuate curve of the direction-changing curve.

10. The energy guiding chain as set forth in claim 8, wherein each one of the link members or segments of the plurality of link members or segments includes one of the plurality of eyes.

11. The energy guiding chain as set forth in claim 8, wherein the plurality of eyes provide a sliding guide for the at least one triggering cord along the longitudinal direction of the energy guiding chain;
wherein each one of the plurality of eyes has play transverse to the longitudinal direction of the energy guiding chain; and
wherein each one of the plurality of eyes has opposing mouth openings which contain the at least one triggering cord, wherein each of the opposing mouth openings has a curved or rounded configuration.

12. The energy guiding chain as set forth in claim 8, wherein each one of the link members or segments of the plurality of link members or segments includes a side plate and/or a separating limb;
wherein the side plate or the separating limb of each one of the link members or segments of the plurality of link members or segments includes one of the plurality of eyes; and
wherein each one of the plurality of eyes is formed as one piece with the side plate or the separating limb of each link member or segment of the plurality of link members or segments, or is added as a separate member to the side plate or separating limb of each link member or segment of the plurality of link members or segments.

13. The energy guiding chain as set forth in claim 12, wherein each one of the plurality of eyes is formed as one piece with the side plate of each link member or segment of the plurality of link members or segments, or is added as a separate component to the side plate of each link member or segment of the plurality of link members or segments.

14. The energy guiding chain as set forth in claim 8, wherein each one of the link members or segments of the plurality of link members or segments includes a separating limb;
wherein the separating limb of each one of the link members or segments of the plurality of link members or segments includes one of the plurality of eyes; and
wherein each one of the plurality of eyes is formed as one piece with the separating limb of each link member or segment of the plurality of link members or segments, or is added as a separate member to the separating limb of each link member or segment of the plurality of link members or segments.

15. The energy guiding chain as set forth in claim 1, wherein the at least one triggering cord is stressed in tension; and wherein a movement of the at least one triggering cord relative to the energy guiding chain is detectable by the detector.

16. The energy guiding chain as set forth in claim 1, wherein the energy guiding chain is provided with a tensile strain relief.

17. The energy guiding chain as set forth in claim 1, wherein the at least one triggering cord has a stretch of <3% at a working load of the energy guiding chain.

18. The energy guiding chain as set forth in claim 1, wherein the at least one triggering cord is guided by the plurality of eyes at a height of a neutral fiber of the energy guiding chain; and
    wherein a relative movement of the at least one triggering cord is detected by the detector upon a break in the energy guiding chain.

19. The energy guiding chain as set forth in claim 18 wherein the at least one triggering cord is guided by the plurality of eyes at uniform spacings and at least over a length corresponding to a region of movement of the direction-changing curve.

20. The energy guiding chain as set forth in claim 1, wherein the at least one triggering cord has an overall length less than 1.5 times an overall length of the energy guiding chain.

21. The energy guiding chain as set forth in claim 2, wherein the at least one sensor comprises at least one of a force sensor, a position sensor, a travel sensor, a vibration sensor and an acceleration sensor.

22. The energy guiding chain as set forth in claim 1, wherein the at least one triggering cord is a low-stretch triggering cord.

23. The energy guiding chain as set forth in claim 1, wherein the at least one triggering cord comprises at least one of a rope and a cable.

24. The energy guiding chain as set forth in claim 1, wherein the at least one triggering cord is formed of at least one wire.

25. The energy guiding chain as set forth in claim 1, wherein the at least one triggering cord is formed of a plurality of fibers.

26. The energy guiding chain as set forth in claim 1, wherein the at least one triggering cord is formed of at least one of steel and plastic.

27. The energy guiding chain as set forth in claim 1, wherein the plurality of interconnected link members or segments for guiding one or more lines further comprises the plurality of interconnected link members or segments for guiding one or more cables.

28. The energy guiding chain as set forth in claim 1, wherein the plurality of interconnected link members or segments for guiding one or more lines further comprises the plurality of interconnected link members or segments for guiding one or more hoses.

29. The energy guiding chain as set forth in claim 1, wherein the failure of the energy guiding chain includes a break of the energy guiding chain.

30. A monitoring system for protecting an energy guiding chain from a failure comprising:
    an energy guiding chain, comprising
    a plurality of interconnected link members or segments for guiding one or more lines between a base and an entrainment member moveable relative to the base, wherein the link members or segments are anglable relative to each other to form a direction-changing curve;
    at least one triggering cord;
    a detector for monitoring the energy guiding chain;
    wherein the detector is operatively connected to the at least one triggering cord for detecting a failure in the energy guiding chain;
    a plurality of eyes arranged on the plurality of interconnected link members or segments;
    wherein the at least one triggering cord is guided by the plurality of eyes such that the at least one triggering cord is guided along a longitudinal direction of the energy guiding chain;
    an evaluation unit connected to the detector; and
    wherein the evaluation unit evaluates signals detected by the detector regarding the energy guiding chain.

31. The monitoring system as set forth in claim 30, wherein the evaluation unit triggers an emergency stop of the entrainment member if a failure in the energy guiding chain is detected by way of the at least one triggering cord.

32. The monitoring system as set forth in claim 30, wherein the evaluation unit detects a failure if a signal produced by the detector lies outside a tolerance field.

33. The monitoring system as set forth in claim 30, wherein the at least one triggering cord is guided by the energy guiding chain, and
    wherein a relative movement of the at least one triggering cord is detected by the detector upon a break in the energy guiding chain.

34. The monitoring system as set forth in claim 31, wherein the at least one triggering cord is guided by the energy guiding chain, and
    wherein a relative movement of the at least one triggering cord is detected by the detector upon a break in the energy guiding chain.

35. The monitoring system as set forth in claim 32, wherein the at least one triggering cord is guided by the energy guiding chain, and
    wherein a relative movement of the at least one triggering cord is detected by the detector upon a break in the energy guiding chain.

36. A method for protecting an energy guiding chain from a line failure comprising:
    providing an energy guiding chain, comprising
    a plurality of interconnected link members or segments for guiding one or more lines between a base and an entrainment member moveable relative to the base, wherein the link members or segments are anglable relative to each other to form a direction-changing curve;
    at least one triggering cord;
    a detector for monitoring the energy guiding chain;
    wherein the detector is operatively connected to the at least one triggering cord for detecting a failure in the energy guiding chain;
    a plurality of eyes arranged on the plurality of interconnected link members or segments;
    wherein the at least one triggering cord is guided by the plurality of eyes such that the at least one triggering cord is guided along a longitudinal direction of the energy guiding chain; and
    using the detector and the at least one triggering cord to detect a failure in an energy guiding chain.

37. The method as set forth in claim 36, wherein the failure of the energy guiding chain includes a break of the energy guiding chain; and
    using the detector and the at least one triggering cord to detect the break in an energy guiding chain.

* * * * *